United States Patent
Schwab

(10) Patent No.: US 9,941,531 B2
(45) Date of Patent: Apr. 10, 2018

(54) METHOD FOR COOLING A FUEL CELL

(75) Inventor: Clemens Schwab, Wendlingen (DE)

(73) Assignee: Daimler AG, Stuttgart (DE)

( * ) Notice: Subject to any disclaimer, the term of this patent is extended or adjusted under 35 U.S.C. 154(b) by 283 days.

(21) Appl. No.: 14/237,613

(22) PCT Filed: Jul. 19, 2012

(86) PCT No.: PCT/EP2012/003047
§ 371 (c)(1),
(2), (4) Date: Feb. 7, 2014

(87) PCT Pub. No.: WO2013/029719
PCT Pub. Date: Mar. 7, 2013

(65) Prior Publication Data
US 2014/0199606 A1    Jul. 17, 2014

(30) Foreign Application Priority Data

Aug. 30, 2011    (DE) .......................... 10 2011 111 945

(51) Int. Cl.
*H01M 8/04*        (2016.01)
*H01M 8/04701*     (2016.01)
(Continued)

(52) U.S. Cl.
CPC ... *H01M 8/04701* (2013.01); *H01M 8/04029* (2013.01); *H01M 8/04626* (2013.01); *H01M 8/04813* (2013.01); *H01M 8/04679* (2013.01)

(58) Field of Classification Search
CPC ......... H01M 8/04701; H01M 8/04029; H01M 8/04626; H01M 8/04813; H01M 8/04679; H01M 8/04373; H01M 8/04425; H01M 8/04686; H01M 8/04776; Y02E 60/50; B60L 11/1892

See application file for complete search history.

(56) References Cited

U.S. PATENT DOCUMENTS

| | | | |
|---|---|---|---|
| 2001/0019789 A1 | 9/2001 | Hirakata | |
| 2010/0167140 A1* | 7/2010 | Balliet | H01M 8/04029 429/428 |
| 2011/0086279 A1* | 4/2011 | Brinner | H01M 8/04029 429/419 |

FOREIGN PATENT DOCUMENTS

| | | |
|---|---|---|
| JP | 2003168454 A | 6/2003 |
| JP | 2005135711 A | 5/2005 |

(Continued)

OTHER PUBLICATIONS

English Translation of Yuichi (JP 2009-170378).*
(Continued)

*Primary Examiner* — Stephen J Yanchuk
(74) *Attorney, Agent, or Firm* — Stephan A. Pendorf; Patent Central LLC

(57) ABSTRACT

A method for cooling a fuel cell (3) using a liquid cooling medium, wherein of the starting materials supplied to the fuel cell and the products discharged from the fuel cell, at least one is gaseous during at least one of the operating conditions. The cooling medium is conveyed through the fuel cell (3) by a coolant conveying device (11). The power consumption of the coolant conveying device (11) is compared to predefined reference values in order to detect gas in the liquid cooling medium by a deviation of the power consumption from the predefined reference values.

14 Claims, 1 Drawing Sheet

(51) Int. Cl.
*H01M 8/04029* (2016.01)
*H01M 8/04537* (2016.01)
*H01M 8/04791* (2016.01)
*H01M 8/04664* (2016.01)

(56) References Cited

FOREIGN PATENT DOCUMENTS

| | | | |
|---|---|---|---|
| JP | 2009170378 A | 7/2009 | |
| JP | 2009238439 A | 10/2009 | |

OTHER PUBLICATIONS

English Translation of Matsumoto (JP 2009-238439).*
Office Action dated Feb. 17, 2015, in Japanese Application No. 2014-527513 (with English language translation).
International Search Report PCT/EP2012/003047, dated Oct. 18, 2012.

* cited by examiner

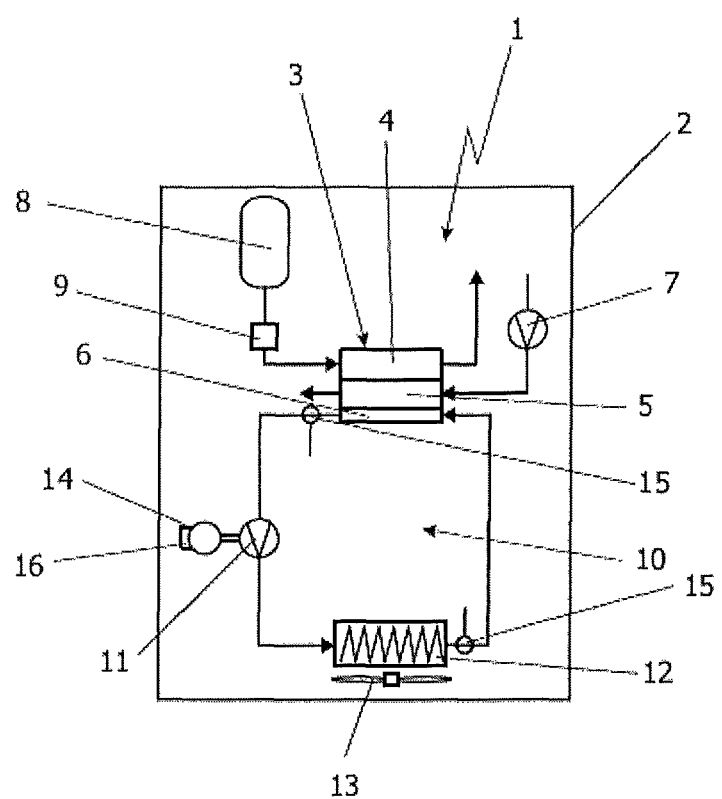

METHOD FOR COOLING A FUEL CELL

BACKGROUND OF THE INVENTION

Field of the Invention

The invention relates to a method for cooling a fuel cell using a liquid cooling medium, in which the starting materials supplied to the fuel cell and the products discharged from the fuel cell, at least one is gaseous during at least one of the operating conditions, and the cooling medium is conveyed through the fuel cell by a coolant conveying device.

Description of Related Art

Fuel cell systems are known from the general prior art. For generating electrical power, these systems use fuel cells, which may be designed as PEM fuel cells, for example. In addition to electrical power and product water, the fuel cells also always generate a certain quantity of waste heat which is undesirable, and which according to the general prior art is discharged from the area of the fuel cell via a liquid cooling medium. The liquid cooling medium is typically conveyed in a cooling circuit by at least one coolant conveying device, and on the one hand flows through the fuel cell for absorbing waste heat, and on the other hand flows through a heat exchanger as a cooler for discharging the absorbed waste heat to the environment, for example.

In particular when the fuel cells are operated with hydrogen, gas leaks within the fuel cell and the fuel cell system are a significant safety hazard, since ignitable or even explosive mixtures may result from hydrogen and the oxygen in the ambient air. In particular in the area of the fuel cell itself, in the event of damage, gases, in particular hydrogen, may pass into the liquid cooling medium. The fuel cells are typically designed as a stack of single cells. The single cells generally have a plate-shaped design, and as a delimitation for an anode chamber and a cathode chamber have plate-shaped elements which are provided with gas channels. The design may be completed in such a way that, for example, the plates are placed with their rear sides against one another with opposite polarities, with a chamber for the cooling medium remaining between the individual plates. Of course, alternative structures in which the adjacent cells are stacked in alternation with opposite polarities are likewise conceivable. In these structures it is also customary to provide chambers or fluid channels for the liquid cooling medium in the area of the plates which delimit the single cells. If a leak or a plate rupture now occurs in the area of such a plate, gas may penetrate into the liquid cooling medium from the cathode chamber and/or the anode chamber of the fuel cell. The gas is then conducted through the cooling circuit system by the liquid cooling medium and the coolant conveying device and eventually typically reaches a compensating reservoir, which is necessary for compensating for the volume of the cooling medium between the standstill temperature and the operating temperature. The compensating reservoir is generally connected to the environment. In this way, the gas may then pass to the environment, where an ignitable mixture may form, in particular when the gas is hydrogen. For this reason, in customary designs a hydrogen sensor must be situated in the area of the compensating reservoir or in the area in which the compensating reservoir is connected to the environment so that possible safety hazards may be ruled out. This is critical, costly, and susceptible to errors with regard to the sensor itself, the line routing for the sensor, and the evaluation of the data.

SUMMARY

The object of the present invention is to provide a method for cooling a fuel cell which avoids these disadvantages, and which allows secure and reliable operation of the fuel cell using simple and efficient means, and without the need for error-susceptible components such as sensors or the like.

According to the invention, this object is achieved by a method for cooling a fuel cell using a liquid cooling medium having features recited in the corresponding claims, in which the starting materials supplied to the fuel cell and the products discharged from the fuel cell, at least one is gaseous during at least one of the operating conditions, and the cooling medium is conveyed through the fuel cell by a coolant conveying device.

In the method according to the invention, it is provided that the power consumption of the coolant conveying device is compared to predefined reference values in order to detect gas in the liquid cooling medium by a deviation of the power consumption from the predefined reference values. Instead of a complicated, costly, malfunction-prone sensor in the area of the compensating reservoir in the cooling circuit, the coolant conveying device, which in any event must be present, is now used to detect gases in the liquid cooling medium. For this purpose, the power consumption of the coolant conveying device is compared to corresponding reference values. If gas bubbles and gas accumulations occur in the area of the coolant conveying device, the coolant conveying device will require less power or its power consumption may fluctuate, since less energy is necessary for conveying the gases than for conveying the liquid cooling medium. Gas in the cooling medium may thus be easily and reliably detected by comparison to corresponding reference values. This gas may still originate from the area of the cathode chamber and be comparatively noncritical air or oxygen-depleted air, or may originate from the area of the anode chamber and be hydrogen. However, regardless of which gas is present in the liquid cooling medium, the gas in the liquid cooling medium, which is present in principle, is always an indication that a leak has occurred in the area of the fuel cell itself. In any event, this is a serious malfunction of the fuel cell which requires appropriate countermeasures, and which according to one particularly preferred refinement of the method according to the invention, for example, warrants an emergency shutdown of the fuel cell. In any case, if the gas is hydrogen, the escape of this hydrogen to the environment and thus a potential hazard are prevented.

The method according to the invention may be used at all times, in principle. According to one particularly preferred refinement of the method according to the invention, it is provided that the power consumption is evaluated above a rotational speed of greater than 30 percent, preferably above a rotational speed of approximately 40 percent, of the nominal rotational speed of the coolant conveying device. The fluctuations in the power consumption which occur when gases are present in a relevant quantity in the cooling medium may be detected at all times in principle. However, above a nominal rotational speed of approximately 30 percent of the nominal rotational speed, in particular a rotational speed of approximately 40 percent of the nominal rotational speed, the detection is sufficiently good and reliable, using simple and efficient means that use of the method according to the invention may have a correspondingly simple and efficient design. Since rotational speeds of the coolant pump above the mentioned limits are present anyway in almost all cases during operation of the cooling circuit, secure and reliable operation of the fuel cell is also still possible, using this design for recognizing power fluctuations which is simplified with regard to the detection of gas in the cooling medium In principle, the power consumption may be detected for any type of drive of the coolant conveying device. However, this may entail a correspondingly high level of effort. In one particularly favorable and advantageous refinement of the method according to the invention, the coolant conveying device is therefore electrically driven. In particular for such an electrically driven coolant conveying device it is very easy and efficient to ascertain the electrical power consumption and compare it to predefined reference values in order to detect gas in the area of the liquid cooling medium.

In one advantageous refinement of the method according to the invention, it may be further provided that the reference values arc predefined as reference curves. In one correspondingly advantageous refinement, the reference values may be appropriately parameterized, for example as a function of the rotational speed of the coolant conveying device, or in particular also as a function of the pressure and/or temperature of the cooling medium. Different reference curves may then be predefined in order to not impair the reliability of fluctuations in the power consumption of the coolant conveying device due to changing operating, pressure, and/or temperature conditions in the cooling medium when power consumption changes due to gas in the liquid cooling medium.

In another very advantageous s embodiment of the method according to the invention, it is further provided that the fuel cell for generating electrical drive power is used in an at least partially electrically driven vehicle. Safety requirements are stringent, in particular for vehicles. Thus, for example, occupants in the vehicle may be endangered by an ignitable or explosive mixture in ambient air and hydrogen. In addition, vehicles, due to the fact that they are mobile, are frequently in situations during transit in which other vehicles and/or individuals are in the surroundings, or in which the vehicle travels into surroundings in which individuals are outside the vehicle. Endangerment of these individuals should likewise be securely and reliably ruled out, so that the very simple, cost-effective, and reliable safety monitoring using the method according to the invention is particularly advantageous, especially for vehicles.

Within the meaning of the invention, vehicles may be understood to mean all land-, water-, or air-based vehicles. The vehicle may be an on-track or off-track vehicle, and may be used, for example, for personal transport and/or transport of goods, in short-distance transport, or as a logistics vehicle. The vehicle may be operated with or without a driver.

Further advantageous embodiments of the method according to the invention result from the remaining dependent method claims, and are made clear based on the exemplary embodiment, which is explained in greater detail below with reference to the FIGURE.

BRIEF DESCRIPTION OF THE DRAWINGS

The single appended FIGURE shows a schematic illustration of a greatly simplified fuel cell system in a vehicle.

DETAILED DESCRIPTION

A fuel cell system 1 in a highly schematic illustration is apparent in the single appended FIGURE. The fuel cell system 1 is intended for installation in an indicated vehicle 2. The core of the fuel cell system 1 is a fuel cell 3, which by way of example is designed as a PEM fuel cell. In its interior the fuel cell 3 essentially has three separate chambers, which in the customary design are in each case implemented as single cells which are then stacked to form a fuel cell stack, a so-called stack. The individual chambers of the single cells of the fuel cell stack 3 are then connected to one another via corresponding line elements or collectors. The chambers illustrated in the FIGURE, using the example of a single cell, are an anode chamber 4, a cathode chamber 5, and a chamber 6 through which a liquid cooling medium flows and which could also be referred to as a cooling heat exchanger. In a manner known as such, the cathode chamber 5 is supplied via an air conveying device 7 as an oxygen supplier. The anode chamber 4 is supplied, for example, with hydrogen from a compressed gas store 8 via a pressure regulation and metering device 9. Unconsumed hydrogen and oxygen-depleted residual air then exit the fuel cell via appropriate lines. The residual hydrogen is then typically consumed via catalytic units or the like, or it may be led in the circuit around the anode chamber 4. Since this has no further relevance to the invention described herein, a description is dispensed with. Of course, the periphery of the fuel cell system 1 may have a much more complex design than that illustrated here by way of example.

The chamber 6 of the fuel cell 3 through which the liquid cooling medium flows as well as a cooling circuit 10 for the liquid cooling medium are the only elements that are relevant to the present invention. This cooling circuit 10 is illustrated in greatly simplified form here, and in the present case is intended solely for cooling the fuel cell 3 itself. Of course, it is possible to correspondingly cool even further components within the fuel cell system 1 or in the vehicle 2 equipped with the fuel cell system 1 via the cooling circuit 10. In addition, in order to influence the cooling, bypass lines (not illustrated) may be present, for example, around the chamber 6 in the fuel cell 3 through which the liquid cooling medium flows. A liquid cooling medium, typically a mixture of water and an antifreeze agent, now flows in the cooling circuit 10. This liquid cooling medium is circulated by a coolant conveying device 11 in the cooling circuit 10, and is cooled in the area of a cooling heat exchanger 12, which is illustrated here by way of example as a vehicle radiator with a fan 13 which optionally facilitates the flowthrough. The cooled cooling medium then flows through the chamber 6 of the fuel cell 3, and at that location absorbs waste heat from the fuel cell 3, which is emitted to the environment in the area of the cooling heat exchanger 12. As previously mentioned, additional built-in components such as a bypass, a volume compensating reservoir, and the like may be provided. Since these components have no further relevance to the present invention, they are not illustrated in order to simplify the FIGURE.

The coolant conveying device 11, which may also be referred to as a coolant pump or pump, is intended to be electrically driven by an electric motor 14 in the exemplary embodiment illustrated here. The coolant conveying device is driven at different rotational speeds, for example, depending on the required cooling power in the chamber 6 of the fuel cell 3. To ensure a controlled drive of the coolant conveying device 11, temperature sensors are typically present in the cooling circuit 10. Two temperature sensors 15 of this type are illustrated by way of example upstream and downstream from the chamber G of the fuel cell 3 in the direction of flow. In addition to varying the rotational speed of the coolant conveying device 10, it is also possible to control the flowthrough in the chamber 6 as well as in the cooling heat exchanger 12 via a bypass by means of a corresponding valve device in order to appropriately set a mixing temperature downstream from the bypass. This also has no further relevance to the present invention, and is known from the general prior art. For this reason, an illustration of the valve device and the bypass line has likewise been dispensed with.

Leaks may occur between the individual chambers in the area of the fuel cell 3. In particular, a so-called plate rupture of the plates which delimit the single cells of the fuel cell stack 3 may result in such leaks. It is particularly critical when hydrogen gas from the anode chamber 4 penetrates into the chamber 6 for the liquid cooling medium. However, the penetration of air from the cathode chamber 5 into the liquid cooling medium in the chamber 6, as a leak from the fuel cell 3, would also be critical for the function of the fuel cell. To now be able to easily, quickly, and reliably recognize such a critical event, in the design of the fuel cell system 1 illustrated here it is provided that an engine control unit 16 of the electric motor 14 for the coolant conveying device 11 is designed in such a way that it compares the power consumption of the coolant conveying device 11, which is detected anyway, to predefined reference values, in particular in the form of reference curves.

Various methods are known from the general prior art for recording suitable reference curves. For example, the power consumption of multiple structurally identical pumps used as a coolant conveying device 11 may be appropriately recorded. For this purpose, the power consumption of the particular pump is recorded over its entire possible rotational speed range. The power consumption during dry running, i.e., the lowest possible power consumption, and the power consumption during regular operation with a closed throttle, i.e., the minimum power consumption during "normal operation," are of primary interest for the subsequent reference curve. The curves which are measured for the particular type of pump are subsequently averaged, resulting in a reference curve for the particular design of the pump. These reference curves may be appropriately parameterized in particular as a function of the rotational speed of the coolant conveying device 11, but also as a function of the pressure and/or the temperature in the cooling medium, in any case the temperature in particular already being detected anyway for controlling the cooling. The reference values or the reference values which are combined to form the reference curve allow a very secure and reliable determination to be made in the process sequence implemented in the control unit 16 as to whether the coolant conveying device 11 is operating as expected, or whether there are deviations in the power consumption. Such deviations in the power consumption may then be appropriately evaluated by virtue of the recognized characteristic of the deviation. Of particular interest here is an evaluation is such a way that the presence of gas in the liquid cooling medium may be detected. Such a gas may typically be present in the liquid cooling medium only when a leak has occurred between one or both chambers 4, 5 of the fuel cell 3 and the chamber 6 of the fuel cell 3 through which the liquid cooling medium flows. Via such gas bubble detection or dry running detection for the coolant conveying device 11, a secure and reliable deduction of gases in the area of the liquid cooling medium may thus be easily and efficiently made without using a malfunction-prone hydrogen sensor in the area of a compensating reservoir, or without the gases in the cooling circuit 10 exiting from the area of a compensating reservoir. The coolant conveying device 11 itself as well as the fuel cell 3 may thus be protected from further damage, in particular in which an emergency shutdown of the fuel cell system 1 occurs. On the one hand this increases the security and the service life of the components used in the fuel cell system 1, since further damage of the coolant conveying device 10 and the fuel cell 3 is averted, and on the other hand increases the safety of individuals present in the surroundings of the vehicle 2 or in the vehicle 2 itself.

It has been found by the inventor that the differences between the reference curves and the measured curves are very small in the lower rotational speed ranges, even when dry running occurs. In this range it is therefore very difficult to make a reliable comparison which allows a secure detection of dry running. However, dry running may be recognized very easily and efficiently in the area of the coolant conveying device 11 when the pump speed is greater than approximately 40 percent of the nominal rotational speed of the coolant conveying device 11 during the detection. However, this is typically almost always the case during regular operation of the cooling circuit 10 of the fuel cell system 1. Gas leaks above a gas inlet rate of approximately 2 liters per minute may then be detected very reliably and efficiently. The method is simpler, more cost-effective, and less susceptible to errors than for corresponding gas sensors in the area of the connection of the cooling circuit 10 to the environment. In addition, the coolant conveying device 11 may be directly and efficiently protected as well, which would not be possible using the sensors due to the time delay between the entry of gas into the liquid cooling medium and the detection of same.

The invention claimed is:

1. A method for cooling a fuel cell (3) using a liquid cooling medium wherein of the starting materials supplied to the fuel cell and the products discharged from the fuel cell, at least one is gaseous during at least one of the operating conditions, the cooling medium being conveyed through the fuel cell (3) by a coolant conveying device (11), the method comprising:
    sensing power consumption of the coolant conveying device (11) versus speed of the coolant conveying device (11) with liquid cooling medium free of gas and recording these as predefined reference values for the fuel cell (3),
    sensing the power consumption of the operational coolant conveying device (11),
    sensing the rotational speed of the operational coolant conveying device (11),
    comparing the sensed power consumption of the coolant conveying device (11) at the sensed rotational speed of the coolant conveying device (11) to predefined reference values,
    detecting gas in the liquid cooling medium by an increase in the sensed rotational speed of the coolant conveying device (11) compared to the power consumption from the predefined reference values, and
    operating the coolant conveying device (11) to cool the fuel cell (3) only while there is no increase in the sensed rotational speed of the coolant conveying device (11) compared to the power consumption from the predefined reference values.

2. The method according to claim 1, wherein an emergency shutdown of at least one of a cooling circuit (10) and the fuel cell (3) takes place when an increase in the sensed rotational speed of the coolant conveying device (11) compared to the power consumption from the predefined reference values is detected.

3. The method according to claim 1, wherein the power consumption is evaluated above a rotational speed of greater than 30 percent of a nominal rotational speed of the coolant conveying device (11).

4. The method according to claim 1, wherein the coolant conveying device (11) is electrically driven.

5. The method according to claim 4, wherein the comparison of the power consumption of the coolant conveying device (11) to the reference values is implemented in a control unit (16) of an electric motor (14) for the drive of the coolant conveying device (11).

6. The method according to claim 1, wherein the reference values are predefined as reference curves.

7. The method according to claim 1, wherein the reference values are predefined differently as a function of the rotational speed of the coolant conveying device (11).

8. The method according to claim 1, wherein the reference values are predefined differently as a function of the pressure and/or temperature of the cooling medium.

9. The method according to claim 1, wherein the fuel cell (3) for generating electrical drive power is used in an at least partially electrically driven vehicle (2).

10. The method according to claim 1, wherein the power consumption is evaluated above a rotational speed of greater than 40 percent of the nominal rotational speed of the coolant conveying device (11).

11. A method for cooling a fuel cell (3) using a liquid cooling medium, wherein of the starting materials supplied to the fuel cell and the products discharged from the fuel cell, at least one is gaseous during at least one of the operating conditions, the cooling medium being conveyed through the fuel cell (3) by a coolant conveying device (11) driven by an electric motor (14), the method comprising:

in a step preliminary to normal operation, sensing power consumption of the electric motor (14) of the coolant conveying device (11) versus speed of the coolant conveying device (11) with liquid cooling medium free of gas, and recording these in a control unit (16) as predefined reference values for the fuel cell (3), then, in normal operation, sensing a temperature of the cooling medium being conveyed through the fuel cell (3) and supplying this temperature of the cooling medium to the control unit (16), using the control unit (16) to control the speed of the electric motor (14) of the coolant conveying device (11) in dependence on the sensed temperature of the cooling medium, sensing the power consumption of the coolant conveying device (11), sensing the rotational speed of the coolant conveying device (11), comparing the power consumption of the coolant conveying device (11) to the predefined reference values stored in the control unit (16), and in the event that the sensed power consumption of the coolant conveying device (11) at the sensed rotational speed is less than the predetermined reference value of the coolant conveying device (11) at the sensed rotational speed, deducing that gas is present in the cooling medium and initiating-countermeasures, and in the event that the sensed power consumption of the coolant conveying device (11) at the sensed rotational speed is the same as the reference value of the coolant conveying device (11) at the sensed rotational speed, continuing cooling the fuel cell (3) using the liquid cooling medium.

12. The method according to claim 11, wherein the countermeasures comprise an emergency shutdown of at least one of a cooling circuit (10) and the fuel cell (3).

13. The method according to claim 1, further comprising: initiating countermeasures of at least one of a cooling circuit (10) and the fuel cell (3) while a deviation of the power consumption from the predefined reference values is detected having a recognized characteristic indicating presence of gas in the liquid cooling medium.

14. The method according to claim 1, wherein the countermeasures comprise an emergency shutdown of at least one of a cooling circuit (10) and the fuel cell (3).

\* \* \* \* \*